Patented July 15, 1924.

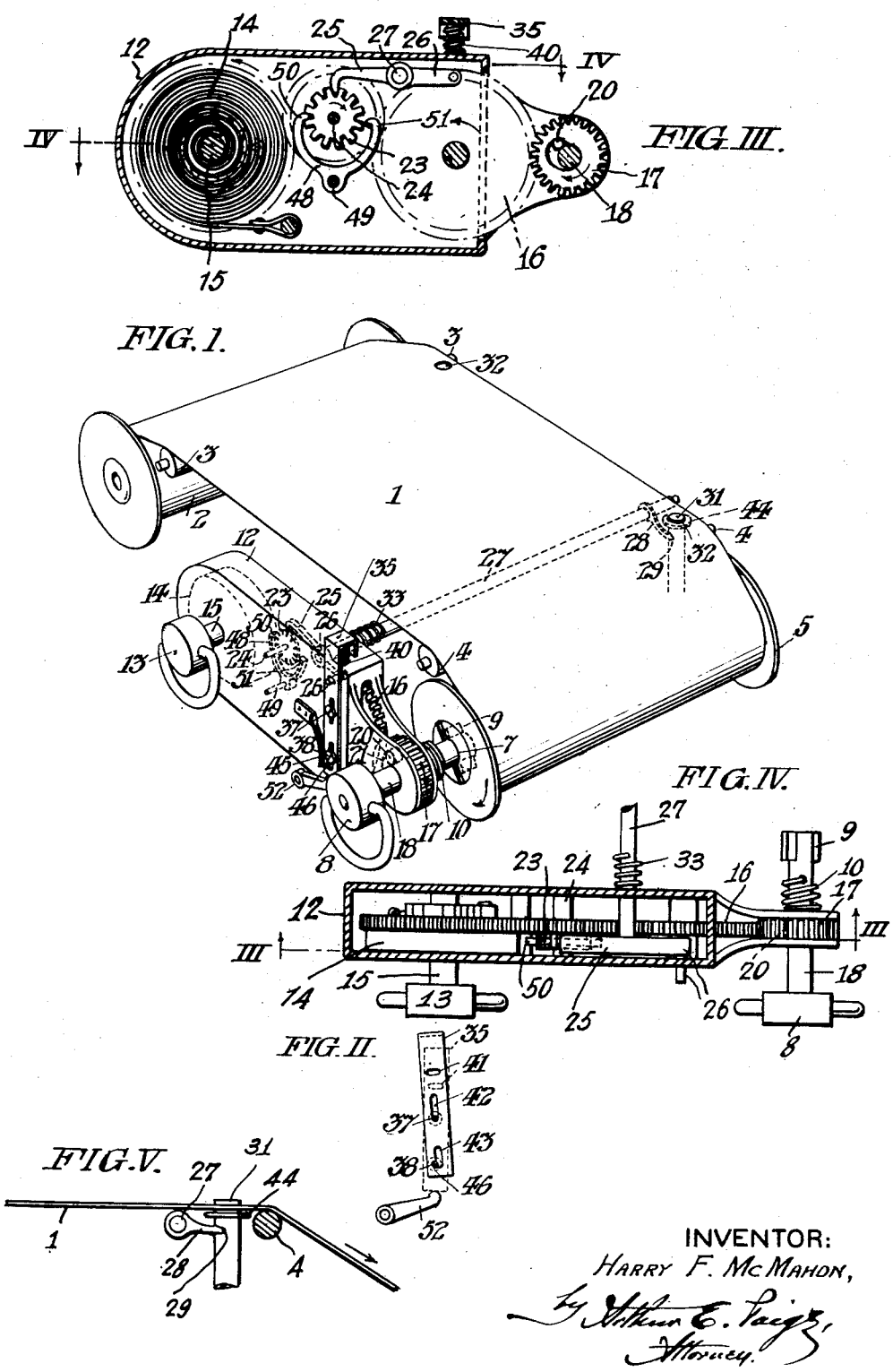

1,501,677

UNITED STATES PATENT OFFICE

HARRY F. McMAHON, OF TORONTO, ONTARIO, CANADA.

CAMERA.

Application filed March 4, 1921. Serial No. 449,599.

*To all whom it may concern:*

Be it known that I, HARRY F. MCMAHON, a citizen of the United States, residing at Toronto, in the Province of Ontario, in the Dominion of Canada, have invented a certain new and useful Improvement in Cameras, whereof the following is a specification, reference being had to the accompanying drawing.

My invention relates to cameras of the type wherein a strip of sensitized film, for a series of pictures, is unwound from one spool on to another. Ordinarily, such movement is effected by manual rotation of the spool upon which the exposed film is wound; the other spool being idly turned by the tension of the strip, which latter is kept taut by friction upon the spool from which it is being unwound. It is frequently desirable to effect several exposures in rapid succession, but so much time is required to thus shift the film, by hand, after each exposure, that it is impossible to secure such a succession of exposures as quickly as is desirable.

Moreover, in order to prepare an exposed film for removal from such a camera; the spool upon which the exposed film is wound must be turned at least ten complete revolutions, by hand, to completely wrap the film and its light excluding wrapper upon that spool, before opening the camera casing to remove the exposed film thus rolled. In other words; such ordinary cameras limit and retard the speed of operation thereof by the labor which their construction and arrangement thus impose upon the operator thereof.

Therefore, the principal object of my present invention is to provide means to automatically and practically instantaneously shift the sensitized film after each exposure thereof, to thus present successive portions thereof as rapidly as the operator can effect exposures; and to rapidly roll the sensitized film automatically, to prepare it for removal; so that a camera embodying my improvement facilitates the operation thereof instead of retarding it; the automatic movements of the camera being effected more rapidly than the operator can require.

The form of my invention hereinafter described includes a spring motor adapted to automatically turn the film take-up spool; but arranged so that said spool may be turned by hand, without disconnecting or disturbing the spring motor mechanism, which latter remains in instant readiness for automatic operation; provided that the spring thereof is wound.

My invention is exemplified herein by a camera of the general kind claimed in Letters Patent of the United States No. 1,369,753 granted to me February 22, 1921, for improvement in cameras, including a button device which is pushable to expose the film, and so arranged that when said device has been operated, it is detained in inoperative position until the film strip is moved for another exposure. Said Letters Patent disclose a spring actuated take-up spool, automatically operate to shift a film as a consequence of the operation of said exposing device, but do not disclose any means for stopping and starting the motor, except by stopping and releasing the film. The present invention includes means for not only stopping and releasing the motor independently of the film, but means for regulating the speed of movement of the film by the motor.

Of course, when said spring is wound, it is under greater tension than when it is unwound, and such tension varies progressively from its wound to its unwound condition. Consequently, said spring tends to move the film much more rapidly when it is tightly wound than when it is near its unwound condition. Such tendency would be negligible if it were not that, if uncontrolled, it has the effect of damaging the film by the sudden strains to which the automatic mechanism, if uncontrolled, subjects the film both when starting and when stopping its movement. Therefore, an important feature of my invention herein claimed is the provision of a speed regulating device, whereby the speed of movement of the film is rendered substantially constant throughout the effective range of movement of the automatic mechanism. As hereinafter described, such regulation is effected by an escapement device of the general character employed in an alarm clock to regulate the speed of operation of a bell clapper.

An adjunctive feature of my invention is a locking device for the push button or other element by which exposure of the film is effected as above contemplated; whereby, when the film is completely exposed and wound upon the take-up spool, such exposing mechanism is prevented from operating, so that the operator is thus compelled to recognize the fact that the camera must be recharged before another exposure can be made.

My invention includes the various novel features of construction and arrangement hereinafter more definitely specified.

In said drawing; Fig. I is a perspective view of parts of a camera embodying my improvement.

Fig. II is a side elevation of the pushable exposing mechanism, showing it locked in inoperative position when a roll of film has been completely exposed and wound.

Fig. III is a vertical sectional view of the motor casing shown in Fig. I, taken on the line III, III in Fig. IV.

Fig. IV is a horizontal sectional view, taken through said motor casing on the line IV, IV in Fig. III.

Fig. V is a fragmentary sectional view showing a portion of the film with the detent mechanism engaged therewith.

Referring to said drawing: The film strip 1 is supplied upon the spool 2, and passes thence over the guide rollers 3 and 4 to the take-up spool 5 which must be turned in the direction of the arrow marked thereon to wind up said film 1 after it is exposed. Said spool 5 is provided with the axial recess 7 for engagement with the ordinary winding handle 8 which has the oppositely extending flanges 9 fitted in said recess and is normally presented therein by the spring 10, but may be withdrawn by axial movement of said handle 8 to release said take-up spool 5 so that the latter may be removed from the camera when said film is entirely wound thereon.

Said handle 8 may be manually turned and axially reciprocated as heretofore, to turn, release and engage the take-up spool 5. However, in accordance with my invention, said handle 8 is provided with automatically operative winding mechanism which is conveniently inclosed in the box frame 12, preferably within the camera casing, but having the handle 13 extending exterior to said casing and arranged to wind the spring indicated at 14 within said frame 12. The arbor 15 of said spring 14 is connected by suitable gearing with the gear wheel 16 which extends from said frame 12 in mesh with the gear 17 which is loosely mounted on the stem 18 of said handle 8. However, said gear 17 is provided with clutch means to engage and turn said winding stem 18 of the take-up spool 5 (when said gear 17 is driven in the direction of the arrow marked on it) by the spring motor mechanism aforesaid. As indicated in dotted lines; such a clutch may consist of a roller 20 carried in said gear 17 in an involutely curved or inclined slot 21 in said gear and touching said winding stem 18; the arrangement being such that said roller 20 is wedged in said slot 21 to grip said stem 18 and turn the latter, and thereby turn said take-up spool 5, when said gear 17 is turned in the direction of the arrow marked thereon; but, when said stem 18 is manually turned in the same direction, it releases the grip of said friction roller 20 by causing it to roll toward the larger end of said slot 21. However, any other suitable clutch device may be employed.

The train of gearing of the spring motor aforesaid includes the escapement wheel 23 having the arbor 24 journaled in said frame 12, and said motor is normally prevented from turning the gear 17 by the engagement of the pallet arm 25 of the tripping lever 26 with said escapement wheel 23, in the position shown in Fig. I. Said tripping lever 26 is rigidly connected with the rock shaft 27 which is journaled at one end in said frame 12, and journaled at its opposite end in the camera casing. Said rock shaft also has, rigidly connected therewith, the tappet lever 28 which is continually engaged in the notch 29 in the reciprocatory detent plunger 31. Said plunger is continually spring pressed upwardly, conveniently by the spiral spring 33 which encircles said rock shaft 27 and has one end attached thereto and the other end attached to said frame 12; so that said plunger 31 constantly tends to rise into the perforations 32 of said film 1 when the latter are successively presented in registry with said plunger.

The construction and arrangement above described are such that the spring 33 automatically insures that the spring motor aforesaid shall be stopped, by the pallet arm 25 of said rock shaft 27 dropping into engagement with the escapement wheel 23, whenever said detent plunger 31 rises to the position shown in the drawing, in which said plunger extends upwardly into a perforation 32 of said film 1; and the engagement of said plunger in such perforation simultaneously locks said film 1 against further movement until said detent plunger 31 is depressed from engagement with the film.

Said detent plunger 31 may be depressed from engagement with the film 1 to release the latter for further winding movement, and said spring motor be simultaneously released to effect such winding movement, by the push slide 35, which should be held depressed only momentarily. Said slide 35 is conveniently mounted for reciprocation upon the outer face of said motor frame 12 to which it is conveniently secured by the two screw studs 37 and 38 and is normally upheld in the position shown, by the spring 40 extending beneath it and bearing upon said frame 12. Said slide 35 has the cross slot 41 engaging said tripping lever 26, as shown in Fig. I, so that when said push slide 35 is pushed downwardly, from the position shown in Fig. I, it rocks said tripping lever 26 downwardly and thus raises the pallet arm 25 thereof and releases said spring motor, and simultaneously lowers said detent plunger 31 to release said film 1 for movement by said motor. Such downward movement of said push slide 35, and the tripping and releasing mechanism connected therewith as above described, is limited by the extent of the slots 42 and 43 in said slide 35 through which said screws 37 and 38 respectively extend, as shown. The upward movement of said push slide and the parts connected therewith is ordinarily limited by the collar 44 on said detent plunger 31 encountering the underside of the film 1, surrounding the perforation 32, in which said plunger extends in the position shown in Fig. I. Such ordinary downward and upward movements of the push slide 35 and the parts connected therewith to alternately release and detain said film 1 and the spring motor mechanism which progresses it as aforesaid, are straight, because of the alinement of said slots 42 and 43 with said screws 37 and 38. However, when said film 1 and its light excluding wrapper are entirely wound upon said take-up spool 5, so that the upward movement of said detent plunger 31 is not stopped by said film, as it is in the position shown; then said slide 35 is freed to move upwardly to the limit of said slots 42 and 43, as indicated in Fig. II and, in that abnormal position, said slide 35 is tilted upon the screw 37 by the spring 45, which is conveniently secured at one end to said frame 12 and has its free end bearing against the left hand edge of said slide 35, so that said screw 38 is engaged in the lateral recess 46 at the bottom of said slot 43 and the downward movement of said slide 35 prevented until it is manually restored to its vertical position indicated by the dotted lines in Fig. I. The purpose and effect of that construction and arrangement is to compel the operator to recognize the fact that the film is entirely wound upon the take-up spool 5 and that the camera should be recharged before another exposure is made.

Of course, the spring 14 must be sufficiently powerful to completely wind the entire length of said film 1 upon said take-up spool 5 and, consequently, would move said film with such stress at the beginning of its unwinding movement as to damage the film in starting and stopping it, unless means are provided to control and substantially regulate the unwinding movement of said spring. I find it convenient to apply such a regulating device to the escapement wheel 23. Although such a regulating device may be of any suitable form and construction, I have indicated an escapement lever 48, of what is known as the "anchor" type, of the general character employed in an alarm clock to regulate the speed of operation of a bell clapper. Said lever 48 is provided with the arbor 49, journaled in said frame 12, and has opposite pallets 50 and 51 which alternately engage the teeth of said escapement wheel 23, the turning movement of said wheel causing said lever 48 to oscillate upon the axis of its arbor 49 at a substantially constant speed, whenever said wheel 23 is released by the pallet arm 25 as above described.

It is to be understood that said push slide 35, which, as above described, is operable to release the film 1 and cause it to be shifted, may also be used to effect short exposures of said film 1, for the reason that said detent plunger 31 projects above the film 1 through the perforation 32 therein to such an extent that sufficient time for such exposures is afforded while said plunger is descending to the released position. For instance, said push slide 35 may cooperate with the shutter operating lever 52 to depress said lever and operate the lens shutter of the camera by the same movements of said slide which release the film and motor, as aforesaid.

Although I have found it convenient to illustrate my invention in connection with a camera of the general class contemplated in my other application aforesaid; it is to be understood that it may be applied to photographic apparatus of any kind, wherein a sensitive film is required to be intermittently shifted. Therefore, I do not desire to limit myself to the precise details of construction and arrangement herein set forth, as it is obvious that various modifications may be made therein, without departing from the essential features of my invention as defined in the appended claims.

I claim:

1. In a camera, the combination with two spools arranged to detachably engage a film strip at its respectively opposite ends; of means arranged to turn one of said spools to progress a film from one end to the other, including an axially reciprocatory handle having an axial stem arranged to detachably axially engage the take-up spool; a gear through which said stem reciprocates; a clutch device connecting said gear with said stem, arranged to turn the latter and said take-up spool, when said gear is turned, and permit said stem to turn, in the same direction, independently of said gear; whereby said take-up spool may be turned by said handle and by said gear, independently of each other; a spring motor arranged to turn said gear; a regulating escapement device, arranged to regulate the speed of said motor; cooperative means arranged to simultaneously stop the movement of said film and of said motor, including a detent plunger adapted to successively engage a longitudinal series of perforations in said film; means arranged to simultaneously release said motor and said film, including means arranged to withdraw said detent plunger from said film; and means arranged to lock said releasing device in inoperative position when the film is entirely wrapped upon said take-up spool; whereby said mechanism indicates when it is necessary to recharge the camera with another film.

2. In a camera, the combination with two spools arranged to detachably engage a film strip at its respectively opposite ends; of means arranged to turn one of said spools to progress a film from one to the other, including an axially reciprocatory handle having an axial stem arranged to detachably axially engage the take-up spool; a gear through which said stem reciprocates; a clutch device connecting said gear with said stem, arranged to turn the latter and said take-up spool, when said gear is turned and permit said stem to turn, in the same direction, independently of said gear; whereby said take-up spool may be turned by said handle and by said gear, independently of each other; a spring motor arranged to turn said gear; a regulating escapement device, arranged to regulate the speed of said motor; cooperative means arranged to simultaneously stop the movement of said film and of said motor, including a detent plunger adapted to successively engage a longitudinal series of perforations in said film; and means arranged to simultaneously release said motor and said film, including means arranged to withdraw said detent plunger from said film.

3. In a camera, the combination with two spools arranged to detachably engage a film strip at its respectively opposite ends; of means arranged to turn one of said spools to progress a film from one to the other, including a handle having a stem arranged to detachably axially engage the take-up spool; a gear on said stem; a clutch device connecting said gear with said stem, arranged to turn the latter, when said gear is turned, and permit said stem to turn, in the same direction, independently of said gear; whereby said take-up spool may be turned by said handle and by said gear, independently of each other; a motor arranged to turn said gear; a regulating device, arranged to regulate the speed of said motor; cooperative means arranged to simultaneously stop the movement of said film and of said motor, including an element adapted to successively engage a longitudinal series of perforations in said film; means arranged to simultaneously release said motor and said film; and means arranged to lock said releasing means in inoperative position when the film is entirely wrapped upon said take-up spool; whereby said mechanism indicates when it is necessary to recharge the camera with another film.

4. In a camera, the combination with two spools arranged to detachably engage a film strip at its respectively opposite ends; of means arranged to turn one of said spools to progress a film from one to the other, including a handle having a stem arranged to detachably axially engage the take-up spool; a gear on said stem; a clutch device connecting said gear with said stem, arranged to turn the latter, when said gear is turned, and permit said stem to turn, in the same direction, independently of said gear; whereby said take-up spool may be turned by said handle and by said gear, independently of each other; a motor arranged to turn said gear; a regulating device, arranged to regulate the speed of said motor; cooperative means arranged to simultaneously stop the movement of said film and of said motor, including an element adapted to successively engage a longitudinal series of perforations in said film; and means arranged to simultaneously release said motor and said film.

5. In a camera, the combination with two spools arranged to detachably engage a film strip at its respectively opposite ends; of means arranged to turn one of said spools to progress a film from one to the other, including a handle having a stem arranged to detachably axially engage the take-up spool; a clutch device arranged to turn said stem and said take-up spool, and permit said stem to turn, in the same direction, independently of said clutch; whereby said take-up spool may be turned by said handle and by said clutch; a regulating device, arranged to regulate the speed of said motor; cooperative means arranged to simultaneously stop the movement of said film and of said motor; means arranged to simultaneously release said motor and said film; and means arranged to lock said releasing means in inoperative position when the film is entirely wrapped upon said take-up spool; whereby said mechanism indicates when it is necessary to recharge the camera with another film.

6. In a camera, the combination with two spools arranged to detachably engage a film strip at its respectively opposite ends; of means arranged to turn one of said spools to progress a film from one to the other, including a handle having a stem arranged to detachably axially engage the take-up spool; a clutch device arranged to turn said stem and said take-up spool, and permit said stem to turn, in the same direction, independently of said clutch; whereby said take-up spool may be turned by said handle and by said clutch, independently of each other;

a motor arranged to turn said clutch; a regulating device, arranged to regulate the speed of said motor; cooperative means arranged to simultaneously stop the movement of said film and of said motor; and means arranged to simultaneously release said motor and said film.

7. In a camera, the combination with a spool arranged to progress a film; of a handle having an axial stem arranged to detachably axially engage said spool; a clutch device arranged to turn said stem and said spool, and permit said stem to turn, in the same direction, independently of said clutch; whereby said spool may be turned by said handle and by said clutch, independently of each other; a spring motor arranged to turn said clutch; a regulating escapement device, arranged to regulate the speed of said motor; cooperative means arranged to simultaneously stop the movement of said film and of said motor; means arranged to simultaneously release said motor and said film; and means arranged to lock said releasing device in inoperative position when the film is entirely wrapped upon said take-up spool; whereby said mechanism indicates when it is necessary to recharge the camera with another film.

In testimony whereof, I have hereunto signed my name at Toronto, Canada, this 1st day of March, 1921.

HARRY F. McMAHON.

Witnesses:
J. F. POINTS.
F. A. BOHNE.